(12) United States Patent
Gosling

(10) Patent No.: US 7,601,254 B2
(45) Date of Patent: Oct. 13, 2009

(54) INTEGRATED FLUID CATALYTIC CRACKING PROCESS

(75) Inventor: Christopher D. Gosling, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 436 days.

(21) Appl. No.: 11/133,050

(22) Filed: May 19, 2005

(65) Prior Publication Data

US 2006/0260981 A1 Nov. 23, 2006

(51) Int. Cl.
*B01J 8/18* (2006.01)

(52) U.S. Cl. ............... 208/59; 208/73; 208/76; 208/106; 208/107; 208/108; 208/111; 208/112; 208/113; 422/139; 502/65; 585/324; 585/330; 585/651; 585/653

(58) Field of Classification Search ........... 208/68, 208/78, 113, 59, 73, 76, 106, 107, 108, 111, 208/112; 502/65; 585/651, 324, 330, 653; 422/139

See application file for complete search history.

(56) References Cited

U.S. PATENT DOCUMENTS

| | | | |
|---|---|---|---|
| 3,409,539 A * | 11/1968 | Paterson | 208/60 |
| 4,127,471 A | 11/1978 | Suggitt et al. | 208/60 |
| 4,762,956 A * | 8/1988 | Liu et al. | 585/259 |
| 4,980,053 A | 12/1990 | Li et al. | 208/120 |
| 5,055,437 A * | 10/1991 | Herbst et al. | 502/67 |
| 5,164,070 A * | 11/1992 | Munro | 208/60 |
| 5,286,692 A | 2/1994 | Zhao et al. | 502/65 |
| 5,914,433 A | 6/1999 | Marker | 585/313 |
| 6,049,017 A * | 4/2000 | Vora et al. | 585/324 |
| 6,224,748 B1 * | 5/2001 | Chang et al. | 208/112 |
| 6,307,117 B1 | 10/2001 | Tsunoda et al. | 585/651 |
| 2003/0121825 A1 * | 7/2003 | Pittman et al. | 208/113 |

* cited by examiner

*Primary Examiner*—Glenn Caldarola
*Assistant Examiner*—Prem C. Singh
(74) *Attorney, Agent, or Firm*—James C Paschall

(57) ABSTRACT

A process for the conversion of a hydrocarbon feedstock to produce olefins, aromatic compounds and ultra low sulfur diesel wherein the hydrocarbon feedstock is reacted in a fluid catalytic cracking (FCC) zone to produce olefins and light cycle oil. The effluent from the FCC is preferably separated to produce a stream comprising ethylene and propylene, a stream comprising higher boiling olefins and light cycle oil (LCO). The stream containing the higher boiling olefins is cracked to provide additional ethylene and propylene. The LCO is selectively hydrocracked to produce aromatic compounds and ultra low sulfur diesel.

8 Claims, 1 Drawing Sheet

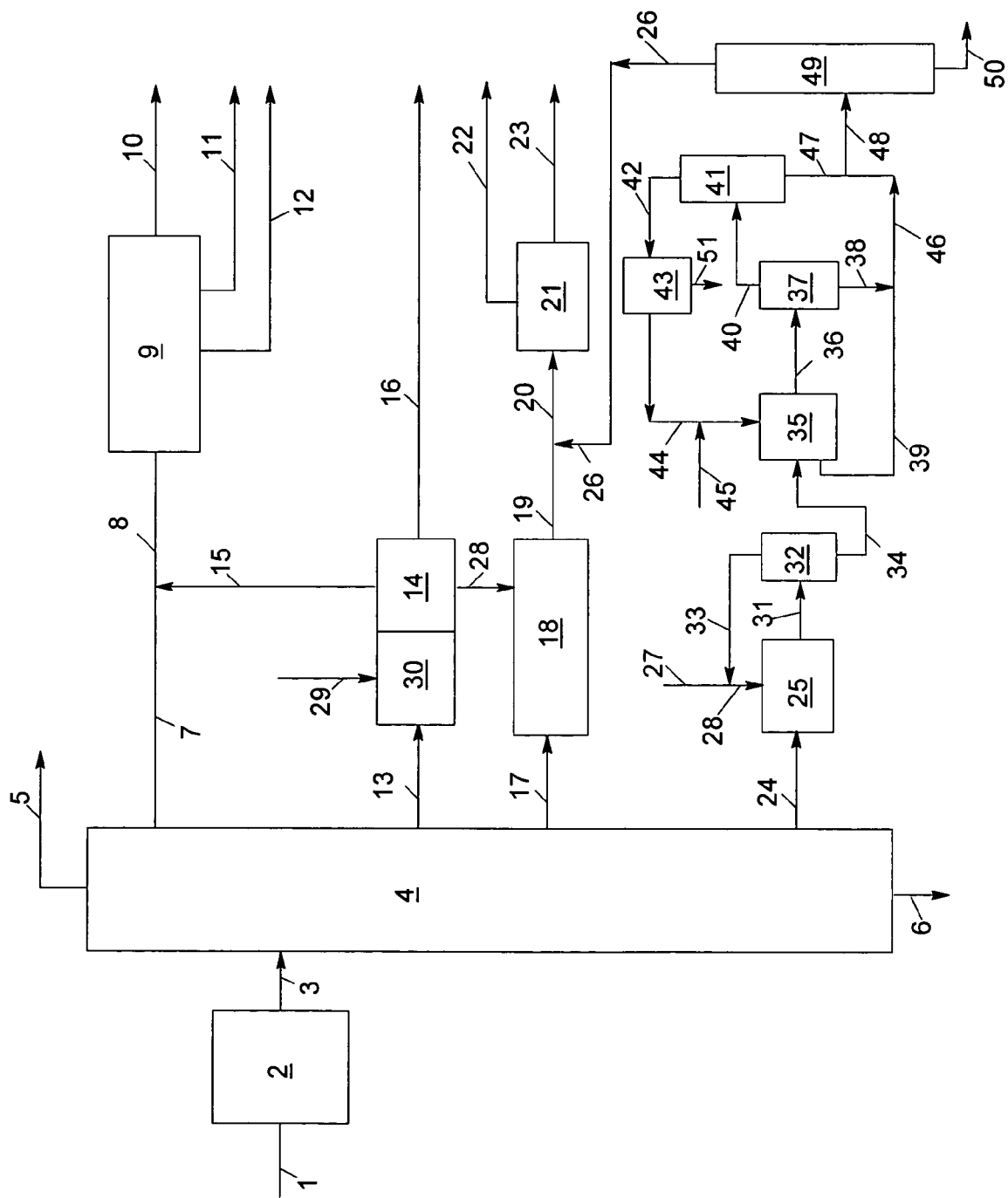

INTEGRATED FLUID CATALYTIC CRACKING PROCESS

FIELD OF THE INVENTION

The present invention relates to an integrated fluid catalytic cracking (FCC) process for the conversion of a hydrocarbon feedstock to produce low molecular weight olefins, aromatic compounds and ultra low sulfur diesel.

BACKGROUND OF THE INVENTION

Light or low molecular weight olefins such as ethylene and propylene, for example, serve as feeds for plastics production and for the production of petrochemicals which serve as feeds for plastics production. The demand for light olefins has been steadily increasing and will continue to increase dramatically. Light olefins have traditionally been produced through the process of steam or catalytic cracking. Paraffin dehydrogenation is an alternative source of light olefins. However, the demand for light olefins is outstripping the capacity of traditional sources of light olefins.

It has been recognized that due to environmental concerns and newly enacted rules and regulations, saleable products must meet lower and lower limits on contaminants such as sulfur and nitrogen. Recently new regulations require the essentially complete removal of sulfur from liquid hydrocarbons which are used in transportation fuels, such as gasoline and diesel.

Aromatic compounds such as benzene, toluene and xylene are valuable petrochemical components. The xylene isomers are produced in large volumes from petroleum as feedstocks for a variety of important industrial chemicals. The most important of the xylene isomers is paraxylene, the principal feedstock for polyester which continues to enjoy a high growth rate from a large base demand. Orthoxylene is used to produce phthalic anhydride. Metaxylene is used in such products as plasticizers, azo dyes and wood preservers. Neither the xylenes nor benzene are produced from petroleum by the reforming of naphtha in sufficient volume to meet demand and conversion of other hydrocarbons is necessary to increase the yield of aromatic compounds including xylenes and benzene.

INFORMATION DISCLOSURE

U.S. Pat. No. 4,127,471 (Suggitt et al.) discloses a process for hydro-cracking a charge stock at mild hydrocracking conditions.

Propylene is conventionally produced through FCC processes, dehydro-genation processes and predominantly from steam cracking processes. The demand for propylene is projected to begin to outstrip supply. FCC units are filling some of this growing demand for propylene. Typically, however, FCC units produce only about 5 weight percent of propylene. Consequently, modifications to FCC units that can increase propylene production are necessary. A representative patent describing such modified FCC processes is U.S. Pat. No. 6,538,169 (Pittman et al.).

Ethylene and propylene are particularly desirable olefins but it has been found that their yields are reduced by the production of medium-weight hydrocarbons, such as $C_4$ to $C_8$ olefins, as well as heavier components. U.S. Pat. No. 5,914,433 (Marker) proposes cracking medium-weight olefins over a catalyst in vapor phase to increase the overall yield of light olefins.

SUMMARY OF THE INVENTION

The present invention is a process for the conversion of a hydrocarbon feedstock to produce olefins, aromatic compounds and ultra low sulfur diesel wherein the hydrocarbon feedstock is reacted in a fluid catalytic cracking (FCC) zone to produce olefins and light cycle oil. The effluent from the FCC is preferably separated to produce a stream comprising ethylene and propylene, a stream comprising higher boiling olefins and light cycle oil (LCO). The stream containing the higher boiling olefins is cracked to provide additional ethylene and propylene. The LCO is selectively hydrocracked to produce aromatic compounds and ultra low sulfur diesel.

BRIEF DESCRIPTION OF THE DRAWING

The drawing is a simplified process flow diagram of a preferred embodiment of the present invention. The above described drawing is intended to be schematically illustrative of the present invention and is not to be a limitation thereof.

DETAILED DESCRIPTION OF THE INVENTION

In accordance with the present invention, a suitable hydrocarbon feedstock may be selected from the group consisting of gas oil, vacuum gas oil and atmospheric residue. The selected feedstock is introduced into a fluid catalytic cracking zone and contacted with a catalyst composed of finely divided particulate catalyst. The reaction of the feedstock in the presence of catalyst is accomplished in the absence of added hydrogen or the net consumption of hydrogen. As the cracking reaction proceeds, substantial amounts of coke are deposited on the catalyst. The catalyst is regenerated at high temperatures by burning coke from the catalyst in a regeneration zone. Coke-containing catalyst, referred to herein as "coked catalyst," is continually transported from the reaction zone to the regeneration zone to be regenerated and replaced by coke-free regenerated catalyst from the regeneration zones. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones and combusting coke in the regenerator are well known by those skilled in the art of FCC processes. Although any type of an FCC process may be used in the present invention, a preferred embodiment utilizes an FCC process which is modified to produce greater yields of light olefins; particularly, ethylene, propylene and butylene with less production of dry gas, i.e., hydrogen, methane and ethane at relatively high conversion. This preferred embodiment comprises contacting the hydrocarbon feed stream with a catalyst composition including at least 1 weight percent of a zeolite having no greater than medium average pore size and at least 0.1 weight percent coke. The contacting preferably occurs in a single reactor for no more than about 2 seconds at a hydrocarbon partial pressure of no more than 172 kPa (25 psia). In a more preferred embodiment, the hydrocarbon feed stream is contacted with a mixture of coked and regenerated catalyst having a composition including at least 1 weight percent of a zeolite having no greater than medium average pore size.

In accordance with the preferred FCC embodiment, the catalyst comprises two components that may or may not be on the same matrix. The two components are circulated throughout the entire system. The first component may include any of the well-known catalysts that are used in the art of fluidized catalytic cracking, such as an active amorphous clay-type catalyst and/or a high activity, crystalline molecular sieve.

Molecular sieve catalysts are preferred over amorphous catalysts because of their much-improved selectivity to desired products. Zeolites are the most commonly used molecular sieves in FCC processes. Preferably, the first catalyst component comprises a large pore zeolite, such as an Y-type zeolite, an active alumina material, a binder material, comprising either silica or alumina and an inert filler such as kaolin.

The zeolitic molecular sieves appropriate for the first catalyst component should have a large average pore size. Typically, molecular sieves with a large pore size have pores with openings of greater than 0.7 nm in effective diameter defined by greater than 10 and typically 12 membered rings. Pore Size Indices of large pores are above about 31. Suitable large pore zeolite components include synthetic zeolites such as X-type and Y-type zeolites, mordenite and faujasite. The Y zeolites with low rare earth content are preferred in the first catalyst component. Low rare earth content denotes less than or equal to about 1.0 wt-% rare earth oxide on the zeolite portion of the catalyst. Octacat™ catalyst made by W. R. Grace & Co. is a suitable low rare earth Y-zeolite catalyst.

The second catalyst component comprises a catalyst containing, medium or smaller pore zeolite catalyst exemplified by ZSM-5, ZSM-11, ZSM-12, ZSM-23, ZSM-35, ZSM-38, ZSM-48, and other similar materials. U.S. Pat. No. 3,702,886 describes ZSM-5. Other suitable medium or smaller pore zeolites include ferrierite, erionite, and ST-5, developed by Petroleos de Venezuela, S. A. The second catalyst component preferably disperses the medium or smaller pore zeolite on a matrix comprising a binder material such as silica or alumina and an inert filer material such as kaolin. The second component may also comprise some other active material such as Beta zeolite. These catalyst compositions have a crystalline zeolite content of 10 to 25 wt-% or more and a matrix material content of 75 to 90 wt-%. Catalysts containing 25 wt-% crystalline zeolite material are preferred. Catalysts with greater crystalline zeolite content may be used, provided they have satisfactory attrition resistance. Medium and smaller pore zeolites are characterized by having an effective pore opening diameter of less than or equal to 0.7 nm, rings of 10 or fewer members and a Pore Size Index of less than 31.

The total catalyst composition should contain 1 to 10 wt-% of a medium to small pore zeolite with greater than or equal to 1.75 wt-% being preferred. When the second catalyst component contains 25 wt-% crystalline zeolite, the total catalyst composition contains 4 to 40 wt-% of the second catalyst component with a preferred content of greater than or equal to 7 wt-%. ZSM-5 and ST-5 type zeolites are particularly preferred since their high coke resistivity will tend to preserve active cracking sites as the catalyst composition makes multiple passes through the riser, thereby maintaining overall activity. The first catalyst component will comprise the balance of the catalyst composition. The relative proportions of the first and second components in the catalyst composition will not substantially vary throughout the FCC unit.

The high concentration of the medium or smaller pore zeolite in the second component of the catalyst composition improves selectivity to light olefins by further cracking the lighter naphtha range molecules. But at the same time, the resulting smaller concentration of the first catalyst component still exhibits sufficient activity to maintain conversion of the heavier feed molecules to a reasonably high level.

FCC feedstocks, suitable for processing by the method of this invention, include conventional FCC feeds and higher boiling or residual feeds. The most common of the conventional feeds is a vacuum gas oil which is typically a hydrocarbon material having a boiling range of from 343° to 552° C. (650° to 1025° F.) and is prepared by vacuum fractionation of atmospheric residue. Heavy or residual feeds, i.e., boiling above 499° C. (930° F.), are also suitable. The FCC process of the present invention is suited best for feedstocks that are heavier than naphtha range hydrocarbons boiling above about 177° C. (350° F.).

An embodiment of the present invention is that the residence time for the feed in contact with the catalyst in a riser is less than or equal to 2 seconds. Any residence time of less than or equal to 2 seconds may be preferred depending on the desired product distribution. The shorter residence time assures that the desired products, light olefins in one case, once obtained do not convert to undesirable products. Hence, the diameter and height of the riser may be varied to obtain the desired residence time.

The riser typically operates with dilute phase conditions above the point of feed injection wherein the density is usually less than 320 kg/m$^3$ (20 lb/ft$^3$) and, more typically, less than 160 kg/m$^3$ (10 lb/ft$^3$). Feed is introduced into the riser and volumetric expansion resulting from the rapid vaporization of the feed as it enters the riser further decreases the density of the catalyst within the riser to typically less than 160 kg/m$^3$ (10 lb/ft$^3$). Before contacting the catalyst, the feed will ordinarily have a temperature in a range of from 149° to 316° C. (300° to 600° F.). Additional amounts of feed may be added downstream of the initial feed point.

The blended catalyst and reacted feed vapors are then discharged from the top of the riser and separated into a cracked product vapor stream including olefins and a collection of catalyst particles covered with substantial quantities of coke and generally referred to as "coked catalyst." In an effort to minimize the contact time of the feed and the catalyst which may promote further conversion of desired products to undesirable other products, this embodiment can use any arrangement of separators to remove coked catalyst from the product stream quickly. In particular, a swirl arm arrangement, provided at the end of the riser can further enhance initial catalyst and cracked hydrocarbon separation by imparting a tangential velocity to the exiting catalyst and cracked product vapor stream mixture. Such swirl arm arrangements are more fully described in U.S. Pat. No. 4,397,738. The swirl arm arrangement is located in an upper portion of a chamber, and a stripping zone is situated in the lower portion of the chamber. Catalyst separated by the swirl arm arrangement drops down into a stripping zone. The cracked product vapor stream comprising cracked hydrocarbons including light olefins and some catalyst exits the chamber via a conduit in communication with cyclones. The cyclones remove remaining catalyst particles from the product vapor stream to reduce particle concentrations to very low levels. The product vapor stream then exits the top of a separating vessel. Catalyst separated by cyclones returns to the separating vessel through diplegs into a dense bed where it will enter the stripping zone. The stripping zone removes adsorbed hydrocarbons from the surface of the catalyst by countercurrent contact with steam.

The present embodiment recycles a first portion of the coked catalyst to the riser without first undergoing regeneration. A second portion of the coked catalyst is regenerated in a regenerator before it is delivered to the riser. The first and second portions of the catalyst may be blended in a blending vessel before introduction to the riser. The recycled catalyst portion may be withdrawn from the stripping zone for transfer to the blending vessel. The recycle conduit transfers the first portion of the coked catalyst stripped of hydrocarbon vapors exiting the stripping zone back to the blending vessel as the recycled catalyst portion at a rate regulated by a control valve.

The second portion of the coked, stripped catalyst is transported to the regeneration zone through a coked catalyst conduit at a rate regulated by a control valve for the removal of coke.

On the regeneration side of the process, coked catalyst transferred to the regenerator undergoes the typical combustion of coke from the surface of the catalyst particles by contact with an oxygen-containing gas. The oxygen-containing gas enters the bottom of the regenerator via an inlet and passes through a dense fluidizing bed of catalyst. Flue gas consisting primarily of $CO_2$ and perhaps containing CO passes upwardly from the dense bed into a dilute phase of the regenerator. A separator, such as cyclones or other means, remove entrained catalyst particles from the rising flue gas before the flue gas exits the vessel through an outlet. Combustion of coke from the catalyst particles raises the temperatures of the catalyst which is withdrawn by a regenerator standpipe.

The regenerator standpipe passes regenerated catalyst from regenerator into the blending vessel at a rate regulated by a control valve where it is blended with recycled catalyst from the separating vessel via a recycle conduit. Fluidizing gas passed into the blending vessel contacts the catalyst and maintains the catalyst in a fluidized state to blend the recycled and regenerated catalyst.

The regenerated catalyst which is relatively hot is cooled by the unregenerated, coked catalyst which is relatively cool to reduce the temperature of the regenerated catalyst by 28° to 83° C. (50° to 150° F.) depending upon the regenerator temperature and the coked catalyst recycle rate. Reducing the catalyst-to-feed contact results in an increased light olefin yield and a decreased dry gas yield.

The amount of blended catalyst that contacts the feed will vary depending on the temperature of the regenerated catalyst and the ratio of recycled to regenerated catalyst comprising the catalyst blend. The term "blended catalyst" refers to the total amount of solids that contact the feed and include both the regenerated catalyst from the regenerator and the recycled catalyst portion from the reactor side of the process. Generally, the blended catalyst to feed will be in a ratio of from 10 to 50. Preferably, the blended catalyst to feed will be in a ratio of from 10 to 30 and more preferably in a ratio of from 15 to 25. The high catalyst-to-feed ratio will operate to maximize conversion which tends to favor light olefin production.

Although it has been well established within the art of FCC that increasing catalyst-to-feed ratios will increase conversion, catalyst-to-feed ratios cannot be easily increased since this ratio is not an independent variable in standard FCC units. Rather the ratio of catalyst to feed is dependent on the heat balance limitations of the unit. Consequently, only relatively low catalyst-to-feed ratios of 4 to 10 are typically observed. One means of increasing the catalyst-to-feed ratio within the riser is to recycle coked catalyst along with regenerated catalyst back to the riser, because this avoids the heat balance limitations. Such a means of increasing catalyst-to-feed ratios, however, was not expected to maintain high catalyst activities due to the coke deactivation of the catalyst. It was discovered that blends of coked and regenerated catalyst have comparable activity to that of the regenerated catalyst. Consequently, recycling coked catalyst can be effectively utilized to increase the catalyst-to-feed ratios in the riser, thereby, allowing operation at very short catalyst-to-feed contact times with catalyst that has been heavily diluted with catalyst containing medium to small pore zeolite while still maintaining high conversions. Maximizing conversion is particularly important in order to maximize yields of key light olefins. The catalyst composition with a relatively low concentration of the first catalyst component and a relatively high concentration of the second catalyst component still exhibits improved conversion and selectivity to light olefins even when a portion of the catalyst composition is coked and when the riser residence time is very short.

Ordinarily, the ratio of recycled catalyst to regenerated catalyst entering the blending zone will be in a broad range of from 0.1 to 5.0 and more typically in a range of from 0.3 to 3.0. Preferably, the blended catalyst will comprise a 1:1 ratio of recycled catalyst to regenerated catalyst. The amount of coke on the recycled catalyst portion returning to the blending vessel will vary depending on the number of times the catalyst particle has recycled through the riser. Since the separation of the catalyst particles out of the riser is random, the coke content of the particles leaving the riser will be normally distributed, varying between the coke content of a particle going through the riser only once and the coke content of a particle that has gone through the riser many times. Nevertheless, the coked catalyst portion entering the regeneration zone as well as the recycled catalyst portion could range from an average coke concentration of between 0.3 to 1.1 wt-%. The preferred range of average coke concentration is 0.5 to 1.0 wt-%. Moreover, the blended catalyst composition will contain at least 0.1 wt-% coke before contacting the feed. When the blending vessel is used, blending of catalyst portions should occur for sufficient time to achieve substantially thermal equilibrium. Further details regarding conditions in the blending vessel are given in U.S. Pat. No. 5,597,537.

Regenerated catalyst from regenerator standpipe will usually have a temperature in a range from 677° to 760° C. (1250° to 1400° F.) and, more typically, in a range of from 699° to 760° C. (1290° to 1400° F.). The temperature of the recycled catalyst portion will usually be in a range of from 510° to 621° C. (950° to 1150° F.). The relative proportions of the recycled and regenerated catalyst will determine the temperature of the blended catalyst mixture that enters the riser. The blended catalyst mixture will usually range from about 593° to 704° C. (1100° to 1300° F.) and, more preferably at about 649° C. (1200° F.).

Low hydrocarbon partial pressure operates to favor the production of light olefins. Accordingly, the riser pressure is set at about 172 to 241 kPa (25 to 35 psia) with a hydrocarbon partial pressure of about 35 to 172 kPa (5 to 25 psia), with a preferred hydrocarbon partial pressure of about 69 to 138 kPa (10 to 20 psia). This relatively low partial pressure for hydrocarbon is achieved by using steam as a diluent to the extent that the diluent is 10 to 55 wt-% of feed and preferably about 15 wt-% of feed. Other diluents such as dry gas can be used to reach equivalent hydrocarbon partial pressures.

The temperature of the cracked stream at the riser outlet will be about 510° to 621° C. (950° to 1150° F.). However, riser outlet temperatures above 566° C. (1050° F.) make more dry gas and little more olefins. Whereas, riser outlet temperatures below 566° C. (1050° F.) make less ethylene and propylene. Thus, a temperature around 1050° F. appears to be optimal and preferred.

The resulting vaporous stream from the FCC reaction zone is separated via conventional fractionation and gas concentration systems to preferably produce a fuel gas stream containing hydrogen and methane, a light hydrocarbon stream containing ethylene and propylene, a medium or intermediate hydrocarbon stream containing $C_4$-$C_7$ olefins, a naphtha stream and a light cycle oil stream. The light hydrocarbon stream containing ethylene and propylene is preferably separated from alkanes in a conventional separation unit to produce an ethylene product stream and a propylene product stream.

In order to maximize the production of ethylene and propylene, the medium hydrocarbon stream containing $C_4$-$C_7$ olefins is reacted in an olefin cracking zone to produce $C_2$-$C_3$ light olefins. Catalysts suitable for olefin cracking comprise a crystalline silicate of the MFI family which may be a zeolite, a silicalite or any other silicate in that family or the MEL family which may be a zeolite or any other silicate in that family. Examples of MFI silicates are ZSM-5 and Silicalite. An example of an MEL zeolite is ZSM-11 which is known in the art. Other examples are Boralite D and silicalite-2 as described by the International Zeolite Association (ATLAS OF ZEOLITE STRUCTURE TYPES, 1987, Butterworths). The preferred crystalline silicates have pores or channels defined by ten oxygen rings and a high silicon/aluminum atomic ratio.

The crystalline silicate catalyst has structural and chemical properties and is employed under particular reaction conditions whereby the catalytic cracking of the $C_4$-$C_7$ olefins readily proceeds. Different reaction pathways can occur on the catalyst. Suitable olefin cracking process conditions include an inlet temperature of from about 400° to about 600° C., preferably from 520° to 600° C., yet more preferably 540° to 580° C., and an olefin partial pressure of from 10 to 202 kPa (1.5 to 29 psia), preferably from 50 to 152 kPa (7 to 22 psia). Olefinic catalytic cracking may be understood to comprise a process yielding shorter molecules via bond breakage and is preferably conducted in the vapor phase.

A crystalline silicate catalyst possessing a high silicon/aluminum ratio can achieve a stable olefin conversion with a high propylene yield on an olefin basis of from 20 to 50 wt-% with the olefinic feedstocks. The MFI catalyst having a high silicon/aluminum atomic ratio for use in the catalytic olefin cracking process may be manufactured by removing aluminum from a commercially available crystalline silicate. A typical commercially available Silicalite has a silicon/aluminum atomic ratio of around 120. The commercially available MFI crystalline silicate may be modified by a steaming process which reduces the tetrahedral aluminum in the crystalline silicate framework and converts the aluminum atoms into octahedral aluminum in the form of amorphous alumina. Although in the steaming step aluminum atoms are chemically removed from the crystalline silicate framework structure to form alumina particles, those particles cause partial obstruction of the pores or channels in the framework. This inhibits the olefin cracking process. Accordingly, following the steaming step, the crystalline silicate is subjected to an extraction step wherein amorphous alumina is removed from the pores and the micropore volume is, at least partially, recovered. The physical removal, by a leaching step, of the amorphous alumina from the pores by the formation of a water-soluble aluminum complex yields the overall effect of de-alumination of the MFI crystalline silicate. In this way by removing aluminum from the MFI crystalline silicate framework and then removing alumina formed therefrom from the pores, the process aims at achieving a substantially homogeneous de-alumination throughout the whole pore surfaces of the catalyst. This reduces the acidity of the catalyst and thereby reduces the occurrence of hydrogen transfer reactions in the cracking process. The reduction of acidity ideally occurs substantially homogeneously throughout the pores defined in the crystalline silicate framework. This is because in the olefin-cracking process hydrocarbon species can enter deeply into the pores. Accordingly, the reduction of acidity and thus the reduction in hydrogen transfer reactions which would reduce the stability of the MFI catalyst are pursued throughout the whole pore structure in the framework. The framework silicon/aluminum ratio may be increased by this process to a value of at least about 180, preferably from about 180 to 1000, more preferably at least 200, yet more preferably at least 300 and most preferably around 480.

The MEL or MFI crystalline silicate catalyst may be mixed with a binder, preferably an inorganic binder, and shaped to a desired shape, e.g. extruded pellets. The binder is selected so as to be resistant to the temperature and other conditions employed in the catalyst manufacturing process and in the subsequent catalytic cracking process for the olefins. The binder is an inorganic material selected from clays, silica, metal oxides such as $ZrO_2$ and/or metals, or gels including mixtures of silica and metal oxides. The binder is preferably alumina-free, although aluminum in certain chemical compounds as in $AlPO_4$ may be used as the latter are quite inert and not acidic in nature. If the binder which is used in conjunction with the crystalline silicate is itself catalytically active, this may alter the conversion and/or the selectivity of the catalyst. Inactive materials for the binder may suitably serve as diluents to control the amount of conversion, so that products can be obtained economically and orderly without employing other means for controlling the reaction rate. It is desirable to provide a catalyst having a good crush strength to prevent the catalyst from breaking down into powder-like materials during use. Such clay or oxide binders have been employed normally for the purpose of improving the crush strength of the catalyst. A particularly preferred binder for the catalyst of the present invention comprises silica or $AlPO_4$.

The relative proportions of the finely divided crystalline silicate material and the inorganic oxide matrix of the binder can vary widely. Typically, the binder content ranges from 5 to 95% by weight, more typically from 20 to 50% by weight, based on the weight of the composite catalyst. Such a mixture of crystalline silicate and an inorganic oxide binder is referred to as a formulated crystalline silicate.

In mixing the catalyst with a binder, the catalyst may be formulated into pellets, spheres, extruded into other shapes, or formed into a spray-dried powder. In the catalytic cracking process, the process conditions are selected in order to provide high selectivity towards propylene or ethylene, as desired, a stable olefin conversion over time, and a stable olefinic product distribution in the effluent. Such objectives are favored by the use of a low acid density in the catalyst (i.e. a high Si/Al atomic ratio) in conjunction with a low pressure, a high inlet temperature and a short contact time, all of which process parameters are interrelated and provide an overall cumulative effect.

The process conditions are selected to disfavor hydrogen transfer reactions leading to the formation of paraffins, aromatics and coke precursors. The process operating conditions thus employ a high space velocity, a low pressure and a high reaction temperature. The LHSV ranges from 5 to 30 $hr^{-1}$, preferably from 10 to 30 $hr^{-1}$. The olefin partial pressure ranges from 10 to 202 kPa absolute (1.5 to 29 psia), preferably from 50 to 152 kPa absolute (7 to 22 psia). A particularly preferred olefin partial pressure is atmospheric pressure. The hydrocarbon feedstocks are preferably fed at a total inlet pressure sufficient to convey the feedstocks through the reactor. The hydrocarbon feedstocks may be fed undiluted or diluted in an inert gas, e.g. nitrogen or steam. The total absolute pressure in the reactor ranges from 30 to 1013 kPa (4 to 147 psia) and is preferably atmospheric. The use of a low olefin partial pressure, for example atmospheric pressure, tends to lower the incidence of hydrogen transfer reactions in the cracking process, which in turn reduces the potential for coke formation which tends to reduce catalyst stability. The cracking of the olefins is preferably performed at an inlet temperature of the feedstock of from 400° to 650° C., more preferably from 450° to 600° C., yet more preferably from 540° to 590° C., typically around 560° to 585° C.

In order to maximize the amount of ethylene and propylene and to minimize the production of methane produced from the medium hydrocarbon stream, it is desired to minimize the presence of diolefins and acetylenes in the medium hydrocarbon feed. Diolefin conversion to monoolefin hydrocarbons may be accomplished with a conventional selective hydrogenation catalyst which comprises an alumina support material preferably having a total surface area greater than 150 m²/g, with most of the total pore volume of the catalyst provided by pores with average diameters of greater than 600 angstroms, and containing surface deposits of about 1.0 to 25.0 wt-% nickel and about 0.1 to 1.0 wt. % sulfur such as disclosed in U.S. Pat. No. 4,695,560. Spheres having a diameter between about 0.4 and 6.4 mm (1/64 and 1/4 inch) can be made by oil dropping a gelled alumina sol. The alumina sol may be formed by digesting aluminum metal with an aqueous solution of approximately 12 wt-% hydrogen chloride to produce an aluminum chloride sol. The nickel component may be added to the catalyst during the sphere formation or by immersing calcined alumina spheres in a aqueous solution of a nickel compound followed by drying, calcining, purging and reducing. The nickel containing alumina spheres may then be sulfided.

The selective hydrogenation is normally performed at relatively mild hydrogenation conditions. These conditions will normally result in the hydrocarbons being present as liquid phase materials. The reactants will normally be maintained under the minimum pressure sufficient to maintain the reactants as liquid phase hydrocarbons which allows the hydrogen to dissolve into the hydrocarbonaceous hydrogenation feed. A broad range of suitable operating pressures therefore extends from about 376 to 5617 kPa (40 to about 800 psig), with a pressure between about 445 and 2169 kPa (50 and 300 psig) being preferred. A relatively moderate temperature between about 25° C. and about 350° C. (77° to 662° F.) should be employed. Preferably, the temperature of the hydrogenation zone is maintained between about 30° and about 200° C. (122° and 392° F.). The liquid hourly space velocity of the reactants through the selective hydrogenation catalyst should be above 1.0 hr$^{-1}$. Preferably, it is above 5.0 and more preferably it is between 5.0 and 35.0 hr$^{-1}$. The ratio of hydrogen to diolefinic hydrocarbons maintained within the selective hydrogenation zone is an important variable. The amount of hydrogen required to achieve a certain conversion is believed dependent upon both reactor temperature and the molecular weight of the feed hydrocarbons. To avoid the undesired saturation of a significant amount of monoolefinic hydrocarbons, there should be less than 2 times the stoichiometric amount of hydrogen required for the selective hydrogenation of the diolefinic hydrocarbons which are present in the liquid phase process stream to monoolefinic hydrocarbons. Preferably, the mole ratio of hydrogen to diolefinic hydrocarbons in the material entering the bed of selective hydrogenation catalyst is maintained between 1:1 and 1.8:1. In some instances, it may be desirable to operate with a less than stoichiometrically required amount of hydrogen, with mole ratios down to 0.75:1 being acceptable. The optimum set of conditions will of course vary depending on such factors as the composition of the feed stream and the degree of saturation of diolefinic hydrocarbons which is desired.

The selective hydrogenation reactor is preferably a cylindrical fixed bed of catalyst through which the reactants move in a vertical direction. It is preferred that the reactants flow upward through the reactor as this provides good mixing. The hydrogenation catalyst may be present within the reactor as pellets, spheres, extrudates, irregular shaped granules, etc. To employ the hydrogenation catalyst, the reactants would be preferably brought to the desired inlet temperature of the reaction zone, admixed with hydrogen and then passed into and through the reactor. Alternatively, the reactants may be admixed with the desired amount of hydrogen and then heated to the desired inlet temperature. In either case, the effluent of the hydrogenation reactor may be passed into a hydrogen recovery facility for the removal of residual hydrogen before proceeding further in the process. Hydrogen may be removed by flashing the hydrogenation effluent stream to a lower pressure or by passing the effluent stream into a stripping column. Otherwise, no residual hydrogen recovery may be necessary if the residual hydrogen concentration in the hydrogenation effluent is acceptable. The effluent from the selective hydrogenation reactor will preferably have less than 100 ppm of diolefins. The selective hydrogenation reactor may be omitted if the concentration of diolefins is already below 100 ppm.

A portion of the olefin cracking feed, when cracked, will be converted to paraffinic compounds such as methane, ethane, propane, and heavier hydrocarbons. Hydrogenation may have the same effect. Unless at least a portion of these paraffinic compounds is removed, they will build up in the system. Therefore, a drag stream comprising $C_4$ and heavier hydrocarbons is removed from the process and used for plant fuel or blended into other hydrocarbon products such as motor gasoline. In a preferred embodiment, the drag stream comprising $C_4$ and heavier hydrocarbons is introduced into a conventional naphtha hydrotreating zone. A stream containing ethylene and propylene is removed from the olefin cracking zone and preferably passed to the hereinabove described light olefin separation zone to produce an ethylene stream and a propylene stream.

The naphtha stream containing gasoline boiling range hydrocarbons including aromatic compounds including benzene, toluene and xylenes is hydrotreated in a conventional naphtha hydrotreating zone to remove sulfur and nitrogen and to saturate heavy olefinic hydrocarbons. The resulting hydrotreated effluent from the hydrotreating zone is introduced into an aromatic solvent extraction zone to recover the aromatic compounds including benzene, toluene and xylenes and to produce a naphtha boiling range hydrocarbon stream having a reduced concentration of aromatic compounds which stream is suitable for gasoline blending.

The light cycle oil (LCO) stream from the product separation zone of the FCC process is first introduced into a denitrification and desulfurization reaction zone and hydrogen at hydrotreating reaction conditions. Preferred denitrification and desulfurization reaction conditions or hydrotreating reaction conditions include a temperature from about 204° C. (400° F.) to about 482° C. (900° F.), a pressure from about 3.5 MPa (500 psig) to about 17.3 MPa (2500 psig), a liquid hourly space velocity of the fresh hydrocarbonaceous feedstock from about 0.1 hr$^{-1}$ to about 10 hr$^{-1}$ with a hydrotreating catalyst or a combination of hydrotreating catalysts.

The term "hydrotreating" as used herein refers to processes wherein a hydrogen-containing treat gas is used in the presence of suitable catalysts which are primarily active for the removal of heteroatoms, such as sulfur and nitrogen. Suitable hydrotreating catalysts for use in the present invention are any known conventional hydrotreating catalyst and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same reaction vessel. The Group VIII metal is typically present in an amount ranging from about 2 to about 20 weight percent, preferably from about 4 to about 12 weight percent. The Group VI metal will typically be present in an amount ranging from about 1 to about 25 weight percent, preferably from about 2 to about 25 weight percent. Typical hydrotreating temperatures range from about 204° C. (400° F.) to about 482° C. (900° F.) with pressures from about 3.5 MPa (500 psig) to about 17.3 MPa (2500 psig), preferably from about 3.5 MPa (500 psig) to about 13.9 MPa (2000 psig).

The resulting effluent from the denitrification and desulfurization zone is introduced into a hydrocracking zone. The hydrocracking zone may contain one or more beds of the same or different catalyst. In one embodiment the preferred hydrocracking catalysts utilize amorphous bases or low-level zeolite bases combined with one or more Group VIII or Group VIB metal hydrogenation components. In another embodiment, the hydrocracking zone contains a catalyst which comprises, in general, any crystalline zeolite cracking base upon which is deposited a minor proportion of a Group VIII metal hydrogenating component. Additional hydrogenation components may be selected from Group VIB for incorporation with the zeolite base. The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and 14 Angstroms. It is preferred to employ zeolites having a silica/alumina mole ratio between about 3 and 12. Suitable zeolites found in nature include, for example, mordenite, stillbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms, wherein the silica/alumina mole ratio is about 4 to 6. A prime example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. The preferred cracking bases are those which are at least about 10 percent, and preferably at least 20 percent, metal-cation-deficient, based on the initial ion-exchange capacity. A specifically desirable and stable class of zeolites are those wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and 30 percent by weight may be used. In the case of the noble metals, it is normally preferred to use about 0.05 to about 2 weight percent. The preferred method for incorporating the hydrogenating metal is to contact the zeolite base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like, if desired, and calcined in air at temperatures of e.g., 371°-648° C. (700°-1200° F.) in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between 5 and 90 weight percent. These diluents may be employed as such or they may contain a minor proportion of an added hydrogenating metal such as a Group VIB and/or Group VIII metal.

Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718 (Klotz).

The hydrocracking of the LCO in contact with a hydrocracking catalyst is conducted in the presence of hydrogen and preferably at hydrocracking reactor conditions which include a temperature from about 232° C. (450° F.) to about 468° C. (875° F.), a pressure from about 3.5 MPa (500 psig) to about 20.8 MPa (3000 psig), a liquid hourly space velocity (LHSV) from about 0.1 to about 30 hr$^{-1}$, and a hydrogen circulation rate from about 337 normal m$^3$/m$^3$ (2000 standard cubic feet per barrel) to about 4200 m$^3$/m$^3$ (25000 standard cubic feet per barrel). The hydrocracking conditions are selected on the basis of the feedstock with the objective of the production of aromatic compounds and ultra low sulfur diesel, preferably containing less than about 10 wppm sulfur.

A hydrotreating/hydrocracking zone may contain one or more vessels or beds each containing one or more types of hydrotreating catalyst or hydrocracking catalyst. When a liquid hydrocarbon stream is recycled to the hydrotreating/hydro-cracking zone, the recycle stream may be introduced directly into a hydrocracking catalyst, or may be passed through a bed of hydrotreating catalyst and then contacted with the hydrocracking catalyst.

The resulting effluent from the hydrocracking zone may be introduced into a hot, high pressure separator, preferably a stripper, to produce a vaporous stream comprising hydrogen, hydrogen sulfide, ammonia and naphtha boiling range hydrocarbons including $C_{10}$-aromatic hydrocarbons, and a first liquid hydrocarbonaceous stream comprising low sulfur diesel boiling range hydrocarbons. The hot, high pressure separator is preferably operated at a temperature from about 149° C.

(300° F.) to about 288° C. (550° F.) and a pressure from about 3.5 MPa (500 psig) to about 17.3 MPa (2500 psig).

The vaporous stream is partially condensed to produce a liquid hydrocarbon stream comprising hydrocarbons boiling in the range from about 38° C. (100° F.) to about 220° C. (428° F.) including $C_{10}$-aromatic hydrocarbons and a vapor stream comprising hydrogen, hydrogen sulfide and ammonia which vapor stream is treated to remove hydrogen sulfide to provide a hydrogen-rich recycle gas. At least a portion of the condensed liquid hydrocarbon stream is stripped to remove normally gaseous hydrocarbon compounds and any dissolved hydrogen sulfide and ammonia. The resulting stripped naphtha boiling range hydrocarbon stream comprising benzene, toluene, xylenes and higher boiling aromatic compounds is introduced into the hereinabove described aromatic solvent extraction zone to recover the aromatic compounds including benzene, toluene and xylenes and to produce a naphtha boiling range hydrocarbon stream.

DETAILED DESCRIPTION OF THE DRAWING

The drawing is a simplified process flow diagram of a preferred embodiment of the present invention. The drawing is intended to be schematically illustrative of the present invention and not be a limitation thereof.

A liquid hydrocarbonaceous feedstock containing reduced crude oil is introduced into the process via line 1 and reacted in a fluid catalytic cracking zone 2. The resulting products from fluid catalytic cracking zone 2 are transported via line 3 and introduced into product separation zone 4. A light dry gas stream containing hydrogen and methane is removed from product separation zone 4 via line 5 and recovered. A stream containing ethylene and propylene and $C_2$-$C_3$ saturates is removed from product separation zone 4 via line 7 and is introduced into light olefin separation zone 9 via lines 7 and 8. An ethylene stream is removed from light olefin separation zone 9 via line 10 and recovered. The propylene stream is removed from light olefin separation zone 9 via line 11 and recovered. A stream containing $C_2$-$C_3$ saturates is removed from light olefin separation zone 9 via line 12 and recovered. A stream containing $C_4$-$C_6$ hydrocarbons having both olefins and saturate hydrocarbons is removed from product separation zone 4 via line 13 and introduced into selective hydrogenation zone 30. A makeup hydrogen gas is provided to selective hydrogenation zone 30 via line 29. A resulting effluent from selective hydrogenation zone 30 is introduced into olefin cracking zone 14. A stream containing ethylene and propylene is removed from olefin cracking zone 14 via line 15 and introduced into light olefin separation zone 9 via lines 15 and 8. A stream containing $C_4$-$C_6$ saturates is removed from olefin cracking zone 14 via line 16 and recovered. A stream containing $C_6^+$ hydrocarbons is removed from olefin cracking zone 14 via line 28 and introduced into naphtha hydrotreating zone 18. A stream containing $C_7$-$C_9$ hydrocarbons is removed from product separation zone 4 via line 17 and introduced into naphtha hydrotreating zone 18. A resulting stream containing aromatic compounds is removed from naphtha hydrotreating zone 18 via line 19 and introduced into aromatic extraction zone 21 via lines 19 and 20. Benzene, toluene and xylenes are removed from aromatic extraction zone 21 via line 22 and recovered. A stream containing naphtha boiling range hydrocarbons having a reduced concentration of aromatic compounds is removed from aromatic extraction zone 21 via line 23 and recovered. A stream containing light cycle oil is removed from product separation zone 4 via line 24 and introduced into hydrotreating zone 25. A hydrogen makeup stream is carried via lines 27 and 28 and introduced into hydrotreating zone 25. A resulting effluent from hydrotreating zone 25 is carried via line 31 and introduced into high pressure separator 32. A hydrogen-rich gaseous stream is removed from high pressure separator 32 via line 33 and recycled to hydrotreating zone 25 via lines 33 and 28. A liquid hydrocarbonaceous stream is removed from high pressure separator 32 via line 34 and introduced into hydrocracking zone 35. A hereinafter described liquid hydrocarbon recycle stream is introduced into hydrocracking zone 35 via line 39. A makeup hydrogen stream is introduced via lines 45 and 44 and introduced into hydrocracking zone 35. A resulting effluent is removed from hydrocracking zone 35 and introduced into hot flash separator 37 via line 36. A liquid stream is removed from hot flash separator 37 via line 38 and a portion is recycled to hydrocracking zone 35 via lines 38 and 39. Another portion is carried via lines 38, 46 and 48 and introduced into fractionation zone 49. A vaporous hydrocarbonaceous stream is removed from hot flash separator 37 via line 40 and introduced into high pressure separator 41. A hydrogen-rich gaseous stream containing hydrogen sulfide is removed from high pressure separator 41 via line 42 and is introduced into absorption zone 43 to remove at least a portion of the hydrogen sulfide via line 51. A resulting hydrogen-rich gaseous stream having a reduced concentration of hydrogen sulfide is removed from absorption zone 43 via line 44 and introduced into hydrocracking zone 35. A liquid stream is removed from high pressure separator 41 via line 47 and introduced into fractionation zone 49 via lines 47 and 48. A stream containing benzene, toluene and xylenes is removed from fractionation zone 49 via line 26 and introduced into aromatic extraction zone 21 via lines 26 and 20. An ultra low sulfur diesel stream is removed from fractionation zone 49 line 50 and recovered. A stream containing clarified slurry oil is removed from product separation zone 4 via line 6 and recovered.

ILLUSTRATIVE EMBODIMENT

In Run 1, a feedstock having the characteristics presented in Table 1 is introduced at a rate of 3951 tons per year into an FCC unit designed to maximize petrochemical products. The product yields of Run 1 are presented in Table 2.

In Run 2, the FCC unit of Run 1 operated at the same conditions and with the same feedstock, and was integrated with an olefin cracking unit and a LCO hydrocracking unit in accordance with the present invention. The product yields of Run 2 are also presented in Table 2. The difference as a percent between Run 1 and Run 2 is presented in the third column of Table 2.

TABLE 1

| Feedstock Analysis Distillation ° C. (° F.) | |
|---|---|
| 5 | 375 (707) |
| 10 | 413 (775) |
| 30 | 476 (889) |
| 50 | 513 (955) |
| Sulfur, weight percent | 0.5 |
| Nickel, weight ppm | 8 |
| Vanadium, weight ppm | 10 |
| Specific Gravity | 0.93 |
| Conradson Carbon, weight percent | 4.9 |

TABLE 2

| | Product Yields | | |
|---|---|---|---|
| Component (tons/year) | Run 1 | Run 2 | Delta, % |
| Feedstock | 3951 | 3951 | |
| Hydrogen | 4 | 29 | |
| Fuel gas | 139 | 164 | 18 |
| Ethylene | 270 | 335 | 24 |
| Propylene | 708 | 969 | 37 |
| $C_2/C_3$ saturates | 110 | 142 | 29 |
| $C_4/C_5$ fraction | 868 | 393 | (55) |
| Gasoline | 107 | 291 | 173 |
| Benzene, toluene, xylenes | 327 | 594 | 81 |
| Ultra low sulfur diesel | 729 | 386 | (47) |
| Fuel oil | 292 | 299 | 2 |
| Coke | 406 | 406 | 0 |

From Table 2 it can be seen that in accordance with the present invention the ethylene and propylene yield increased by 24 percent and 37 percent, respectively compared with the FCC unit alone. The light cycle oil is being hydrocracked to provide benzene, toluene and xylene.

The foregoing description, drawing and illustrative embodiment clearly illustrate the advantages encompassed by the process of the present invention and the benefits to be afforded with the use thereof.

What is claimed is:

1. A process for conversion of a hydrocarbon feedstock to produce olefins, saturated hydrocarbons, aromatic compounds, naphtha hydrocarbons having a boiling range from 36° C. (97° F.) to 193° C. (379° F.), and ultra low sulfur diesel (ULSD) which process comprises:

(a) reacting the hydrocarbon feedstock in a fluid catalytic cracking zone to produce a hydrocarbon product mixture comprising $C_2$-$C_3$ olefins, $C_4$-$C_6$ olefins, $C_4$-$C_6$ saturated hydrocarbons, $C_7$-$C_9$ hydrocarbons and light cycle oil (LCO);

(b) passing the $C_2$-$C_3$ olefins from step (a) to a light olefin separation zone to produce at least an ethylene-enriched stream and a propylene-enriched stream;

(c) reacting the $C_4$-$C_6$ olefins and $C_4$-$C_6$ saturated hydrocarbons from step (a) in an olefin cracking zone to produce olefin cracking zone product mixture comprising $C_2$-$C_3$ olefins, $C_4$-$C_6$ saturated hydrocarbons, and a $C_6$+ hydrocarbons stream;

(d) separating at least a portion of the $C_2$-$C_3$ olefins, $C_4$-$C_6$ saturated hydrocarbons, $C_6$+ hydrocarbons stream from the olefin cracking zone product mixture of step (c), recovering at least a portion of the $C_2$-$C_3$ olefins and $C_4$-$C_6$ saturated hydrocarbons and passing at least a portion of the $C_6$+ hydrocarbons stream to step (e);

(e) reacting the $C_7$-$C_9$ hydrocarbons from step (a) and at least a portion of the $C_6$+ hydrocarbons stream from step (d) in a naphtha hydrotreating (HT) zone to produce a naphtha HT zone product mixture comprising aromatic compounds and naphtha hydrocarbons and recovering the naphtha HT zone product mixture;

(f) reacting the LCO from step (a) in a two-stage process comprising a $1^{st}$ stage and a $2^{nd}$ stage, wherein the $1^{st}$ stage comprises a LCO hydrotreating (HT) zone and the $2^{nd}$ stage comprises a LCO hydrocracking (HC) zone wherein, 1) the LCO HT zone comprises a LCO HT reactor having a LCO HT catalyst and a $1^{st}$ stage high pressure separator (HPS) communicating with the LCO HT reactor and a LCO HC reactor in the LCO HC zone;

2) the LCO HC zone comprises a LCO reactor having a LCO HC catalyst and a $2^{nd}$ stage HPS and a hot flash seperator (HFS) disposed between and independently in fluid communication with the LOG HC reactor and the $2^{nd}$ stage HPS, and producing at least a first and second HFS product stream comprising liquid such that a portion of the liquid is recycled to the LCO HC reactor, wherein i) each HFS product stream comprises aromatic compounds and ULSD having a sulfur content of 10 wppm or less, ii) the at least the first HFS product stream is recycled to the LCO HC reactor, and iii) the at least the second HFS product stream is passed to a fractionation zone for recovering a first fractionation zone product stream comprising the aromatic compounds and a second fractionation zone product stream comprising ULSD.

2. The process of claim 1 wherein the hydrocarbon feedstock is selected from the group consisting of gas oil, vacuum gas oil and atmospheric residue.

3. The process of claim 1 wherein the aromatic compounds are selected from the group consisting of benzene, toluene and xylene.

4. The process of claim 1 wherein the LCO HC reactor is operated at conditions including a temperature from 371° C. (700° F.) to 427° C. (800° F.), a pressure from 3.5 MPa (500 psig) to 10.4 MPa (1500 psig), a liquid hourly space velocity (LHSV) from 1.0 to 2.0 hr$^{-1}$ and a hydrogen circulation rate from 500 nm$^3$/m$^3$ (3000 standard cubic feet per barrel) to 1667 nm$^3$/m$^3$ (10,000 standard cubic feet per barrel).

5. The process of claim 1 wherein a selective hydrogenation zone precedes and is in fluid communication with the olefin cracking zone, wherein the olefin cracking zone is operated at conditions including a temperature from 400° C. to 600° C. and an olefin partial pressure from 10 to 202 kPa.

6. The process of claim 1 wherein the at least a portion of the naphtha HT zone product mixture in step (e) passed to in an aromatic solvent extraction zone to produce at least two naphtha HT zone product streams, the first naphtha HT zone product stream comprising the aromatic compounds and the second naphtha HT zone product stream comprising the naphtha hydrocarbons with a reduced aromatic compounds content.

7. The process of claim 1 wherein the $C_2$-$C_3$ olefins from step (d) are combined with the $C_2$-$C_3$ olefins in step (b) before or while the $C_2$-$C_3$ olefins in step (b) are passed to the light olefin separation zone.

8. The process of claim 1 wherein the first fractionation zone product stream comprising the aromatic compounds of step (f) is mixed with the naphtha HT zone product mixture in step (e).

* * * * *